United States Patent [19]
Broillet

[11] Patent Number: 5,863,004
[45] Date of Patent: Jan. 26, 1999

[54] GRANULATING MACHINE

[75] Inventor: Michel Broillet, Marly, Switzerland

[73] Assignee: Frewitt Maschinenfabrik AG, Granges-Paccot, Switzerland

[21] Appl. No.: 779,591

[22] Filed: Jan. 7, 1997

[30] Foreign Application Priority Data

Jan. 19, 1996 [CH] Switzerland ............... 00147/96

[51] Int. Cl.⁶ ................................................. B02C 19/00
[52] U.S. Cl. ........................................... 241/74; 241/259.1
[58] Field of Search .......................... 241/74, 69, 259.1, 241/286, 213

[56] References Cited

U.S. PATENT DOCUMENTS

| | | | |
|---|---|---|---|
| 4,605,173 | 8/1986 | Edmonds | 241/69 |
| 4,759,507 | 7/1988 | Lynch et al. . | |
| 4,768,722 | 9/1988 | Lynch et al. . | |
| 4,773,599 | 9/1988 | Lynch et al. . | |
| 4,844,362 | 7/1989 | Revnivtsev et al. | 241/213 |
| 5,282,579 | 2/1994 | Poser et al. | 241/69 |
| 5,330,113 | 7/1994 | Poser et al. . | |
| 5,405,094 | 4/1995 | Poser et al. . | |
| 5,607,062 | 3/1997 | Poser et al. . | |

*Primary Examiner*—Mark Rosenbaum
*Attorney, Agent, or Firm*—Ostrolenk, Faber, Gerb & Soffen, LLP

[57] ABSTRACT

The height positioning of the rotor (4) and thus the play between the wings (3) of the rotor and the sieve (5) of the machine are adjustable by means of an adjusting system (20–26), even during operation of the machine. The drive of the rotor (4) by a belt (19) allows to omit gears as well as an oil bath for the drive. The risk of a contamination of the granulated material by residues is thus obviated. The sieve (5) is supported on a retaining ring (6) which allows to adjust the height of the sieve in such a manner that the internal surface of the sieve is always at the same position independently of the thickness of the sieve. It is thus possible to adjust the play between the sieve and the rotor with precision.

16 Claims, 3 Drawing Sheets

GRANULATING MACHINE

BACKGROUND OF THE INVENTION

1. Field of the Invention

The present invention refers to a granulating machine having a sieve in the form of a truncated cone in which a rotor is disposed which is mounted on a shaft, the shaft rotating in at least one bearing and being coupled to a lateral driving element which is arranged under the sieve and the rotor, the machine thus being designed for in-line operation.

2. Description of the Related Art

Such a machine is known for example, from U.S. Pat. No. 5,330,113. The rotor of this machine turns on bearings which are accommodated in a protective casing of a gear transmission. The casing is arranged under the rotor, the latter being driven by a lateral driving shaft and by the bevel gears which are mounted on the rotor shaft and on the driving shaft. The axial position of the rotor on its shaft, the play between the rotor and the sieve, is adjustable by increasing or reducing the number of washers which are disposed between the upper end of the rotor shaft and the bottom of the rotor bore. It is obvious that in order to vary the axial position of the rotor, the latter must be dismounted from its shaft which, in addition, is impossible without stopping the machine.

U.S. Pat. No. 4,773,599 discloses a granulating machine having a device which allows an adjustment of the axial position of the rotor and thus of the play between the rotor and the sieve. The adjustment is effected by means of a disk which is accessible from the top side of the rotor and the sieve, an in-line operation being impossible due to the disk, the rotor axis, and the bearings of the rotor which are disposed above the rotor.

A first object of the present invention is to eliminate these drawbacks. This object is attained by a granulating machine wherein the rotor including its shaft is axially displaceable by an adjusting device acting upon the shaft of the rotor underneath the rotor and the sieve. Preferentially, the adjusting device is acting upon the bearing of the rotor, which is axially displaceable.

Another drawback of the known machine is the fact that the bevel gears which are transmitting the rotation of the driving shaft to the rotor shaft must be in an oil bath, which requires an absolute tightness of the casing in which the bevel gears and the bearings of the rotor shaft and of the driving shaft are accommodated. However, the risk of leakages cannot be totally eliminated, and it is easy to imagine the damages caused by oil leakages, particularly if the machine is used for the treatment of pharmaceutical products. Thus, another object of the present invention is to prevent these drawbacks. This object is attained by a granulating machine wherein the driving shaft of the rotor is driven by a belt.

BRIEF DESCRIPTION OF THE DRAWINGS

The invention is explained in more detail hereinafter by means of an exemplary embodiment which is illustrated in the appended drawings.

DETAILED DESCRIPTION OF THE INVENTION

Figure 1:
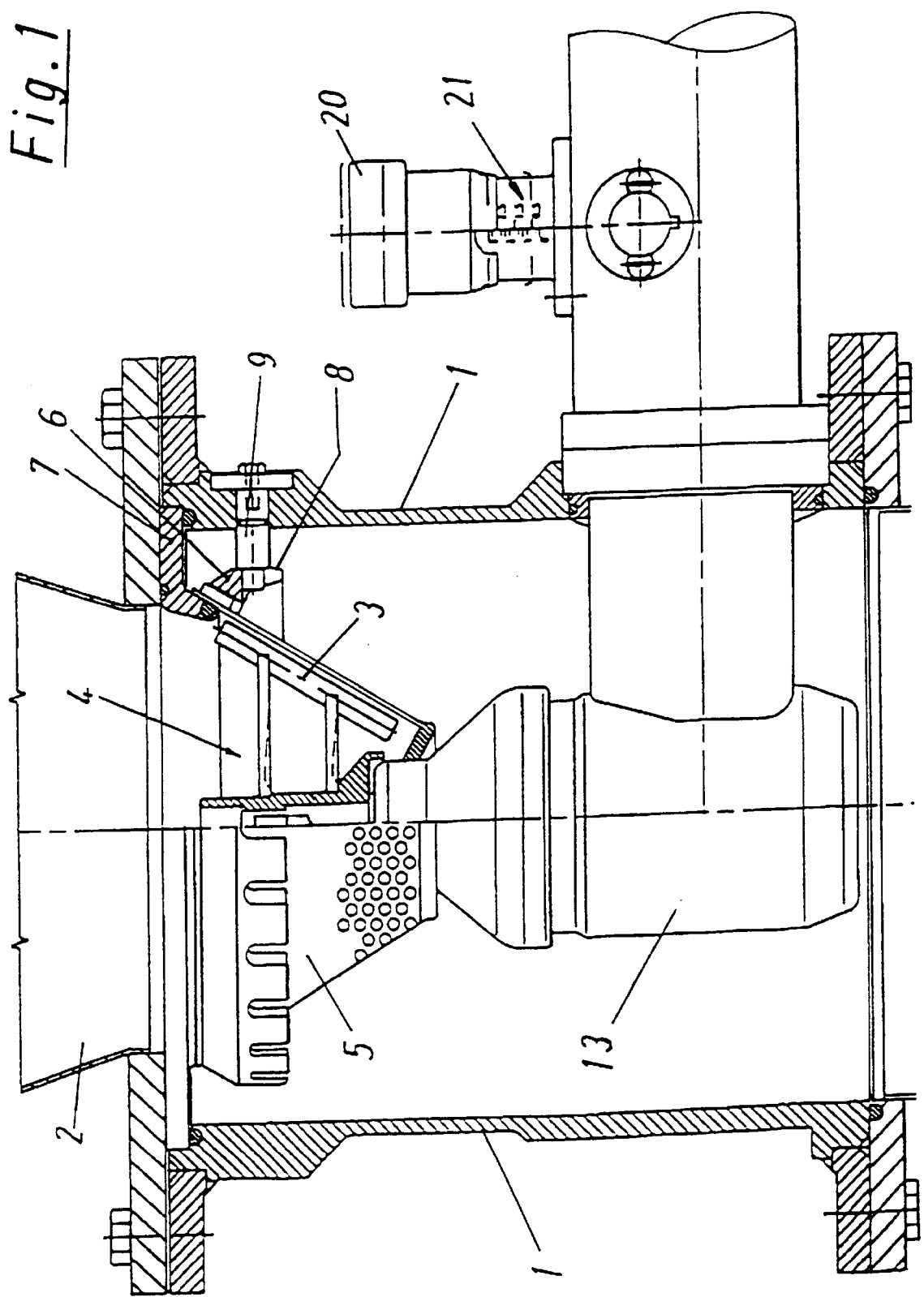
FIG. 1 shows a partially sectioned view of the machine.

The illustrated machine comprises a tubular frame 1 having a vertical channel for the passage of the granulates, the material which is to be granulated being introduced in a funnel 2 and pressed through a sieve 5 having the form of a truncated cone by the wings 3 of a rotor 4. The granulated material drops into the vertical channel, which allows an in-line operation, the material is passing the machine in a vertical direction and according to a single axis.

The upper edge of sieve 5 rests on a conical surface of a retaining ring 6 against which the sieve is pressed by a clamping ring 7.

Figure 3:
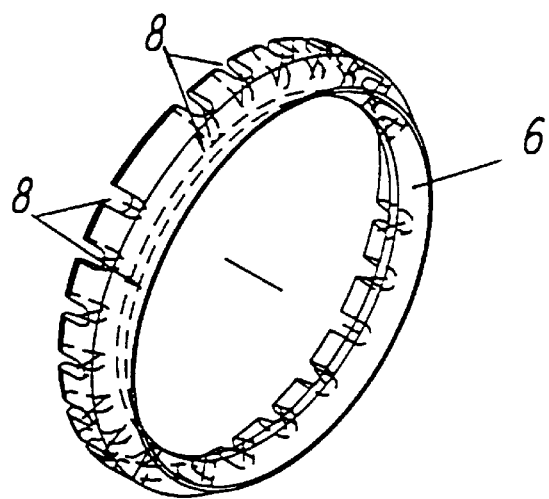
FIG. 3 shows a retaining ring.

Retaining ring 6, which is provided with three series of incisions 8 of different depths (FIG. 3), is supported by three pins 9 which engage in one of the incisions 8 of the corresponding series each. Consequently, the vertical position, or the height adjustment of the retaining ring, is a function of the depth of incisions 8. It is thus possible to determine the vertical position of the sieve by the angular position of retaining ring 6, which allows to compensate for the thickness of sieve 5 so that the internal surface of the sieve (i.e. the surface facing the channel) is always at the same height independently of its thickness.

Figure 2:
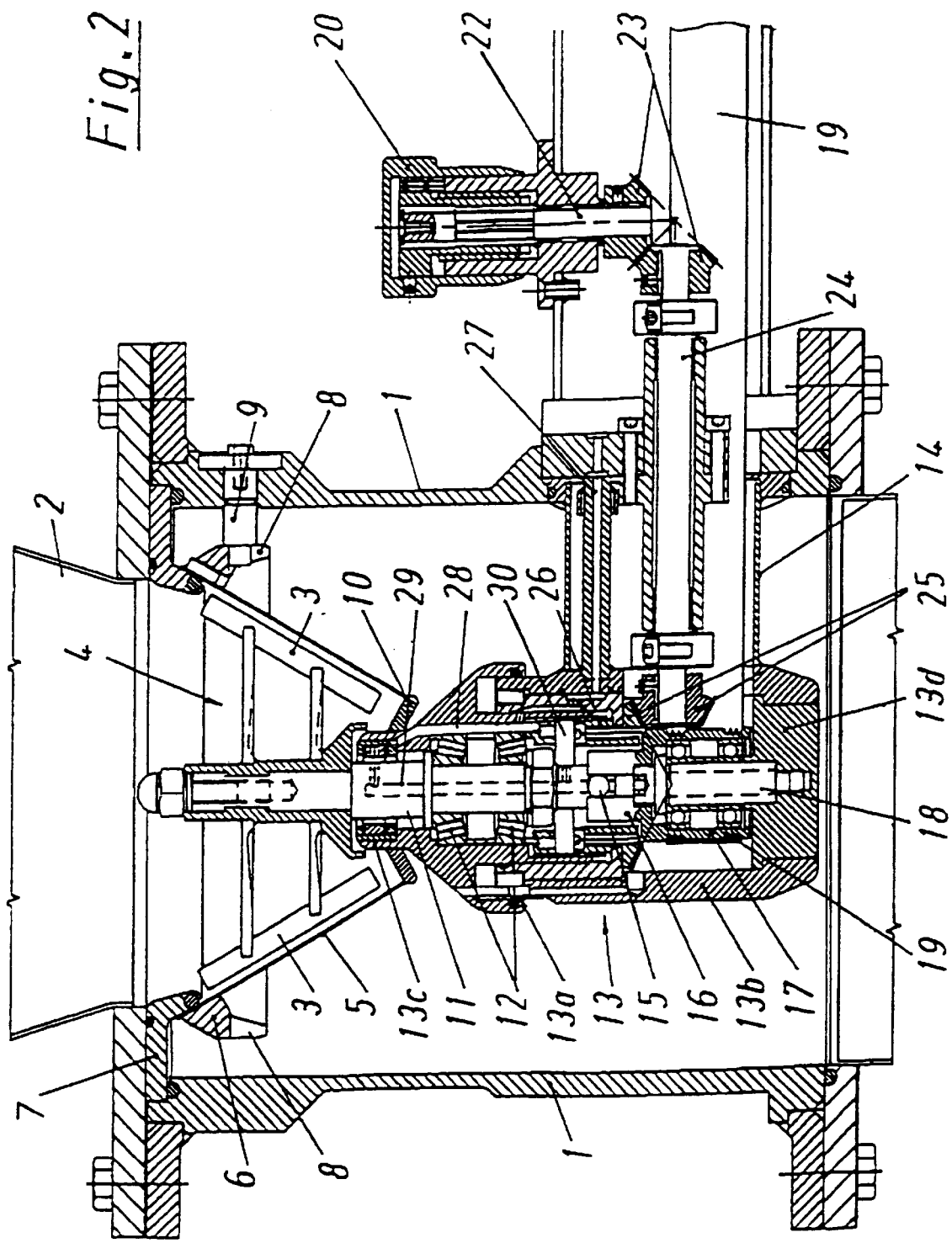
FIG. 2 shows an axial cross-section of the machine.

Referring to FIG. 2, lower end of sieve 5 is welded to a conical guiding flange 10. Several seals ensure the tightness between the different parts of the machine.

In the present example, shaft 11 of rotor 4 turns on two conical roller bearings 12 in an upper portion 13a of a casing 13. The lower portion 13b of the casing is welded to a supporting tube 14 which is fixed to tubular frame 1. Casing 13 comprises a base 13d which is welded to its lower portion 13b.

A transversal pin 15, provided at the lower end of rotor shaft 11, is in engagement with a fork 16 of a drum 17 which is rotatable around an axle 18 on a ball bearing. Drum 17 is capable of being rotated by a belt 19 which itself is driven by a non-represented motor. The rotor shaft 11 and the rotor 4, which are freely rotatable, are thus coupled to drum 17 while being axially displaceable due to the coupling by means of pin 15 and fork 16. A collar 13c of the casing engages in flange 10 of sieve 5 with little play.

The axial displacement of upper portion 13a of the casing, including bearings 12, shaft 11, and rotor 4, is actuated and controlled by means of an adjusting device. The adjusting device comprises an adjusting wheel 20 which is associated with a vernier 21 (FIG. 1). The rotation of wheel 20 is transmitted by a shaft 22, bevel gears 23, an adjusting shaft 24, and bevel gears 25 to a bushing 26 having a thread which cooperates with an internal thread of the upper portion 13a of casing 13. By rotation of bushing 26, the upper portion 13a of casing 13 along with bearings 12, rotor shaft 11, and rotor 4 are vertically displaceable, even while the machine is operating, for the purpose of adjusting the distance or the space between rotor 4, i.e., its arms 3, and the internal surface of sieve 5.

The relative position of arms 3 of the rotor with respect to the internal surface of sieve 5 is indicated on vernier 21 since wheel 20 is axially displaced when it is rotated in order to adjust the distance between the rotor and the sieve. In other words, this distance is directly displayed and readable on vernier 21. In addition, as the positioning of the internal surface of sieve 5 always stays the same independently of the thickness of the sieve due, as specified above, to the relative position of retaining ring 6 with respect to the sieve, the above-described adjusting device allows to effect a precise adjustment without touching the sieve nor any other elements except wheel 20.

It is also understood that the externally effected adjustment of the distance between the rotor and the sieve by means of the precision adjusting device ensures a perfect reproducibility of the parameters of the adjustment as it is required in the pharmaceutical industry for the validation of manufacturing procedures.

Of course, it is advantageous to provide two complementary devices (not shown in the drawings): first, a locking device for the effected adjustment, in order to exclude any intermediate positions. Such a locking action may be obtained e.g., by providing a snap-in mechanism. Further, stops may be provided which limit the lower positioning of the rotor in such a manner as to prevent any contact between the latter and the sieve, on one hand, and on the other hand, the creation of metallic particles due to the friction of metal on metal.

The machine comprises a cooling system. Cooling air can be admitted through a tube 27, a channel 28, and a bore 29 of rotor shaft 11 to space 30 and to the space surrounding coupling 15, 16 and drum 17. It is thus possible to maintain the temperature of the components which are subject to heating at an acceptable level.

Besides the already mentioned advantages and attained objects, the machine features the following favorable characteristics: Due to the fact that sieve 5 is fastened from the inside, the geometrical shape and the position of the sieve are perfectly determined.

Casing 13 with its welded base 13d and tube 14 which is welded to the lower portion 13b of the casing form an absolutely tight assembly without any fastening elements or other elements which might become detached, while the only two connections between moving mechanical elements are disposed in the upper portion, i.e., above sieve 5. This construction allows to obviate a twofold risk of contamination of the granulates. In fact, the latter can come into contact neither with oily or fatty residues or other particles and dust, nor with any detached component which might fall off.

By the clamping system acting from above, a centering and a correction of an eventual eccentricity of the sieve are obtained. The lower guiding flange 10 of the sieve increases its rigidity while facilitating the centering of the sieve, and the outward incline of the flange allows a good flow of the product towards the wall of the sieve. It is possible to stack sieves without any contact of their walls on each other. The large space left between the sieve and the wall of the frame facilitates the removal and the replacement of the sieve/s. The machine is easily cleaned and dismounted and may be sterilized in line.

Several additional modifications of the illustrated machine are possible. Cleaning nozzles may be installed. The shape and the size of the perforations of the sieve may be adapted to the requirements. Sieves 5 and retaining ring 6 may be provided with locking means, in such a manner that the mounting of the sieve and of the retaining ring may only be effected in the single correct position and any error becomes impossible. A temperature probe may be provided which allows to control the system, i.e., to adapt the speed, to stop the machine, or to activate the cooling system, as the case may be. Also, means may be provided for the purpose of limiting the downward stroke of the rotor in order to prevent any direct contact between the rotor and the sieve.

Figure 4:
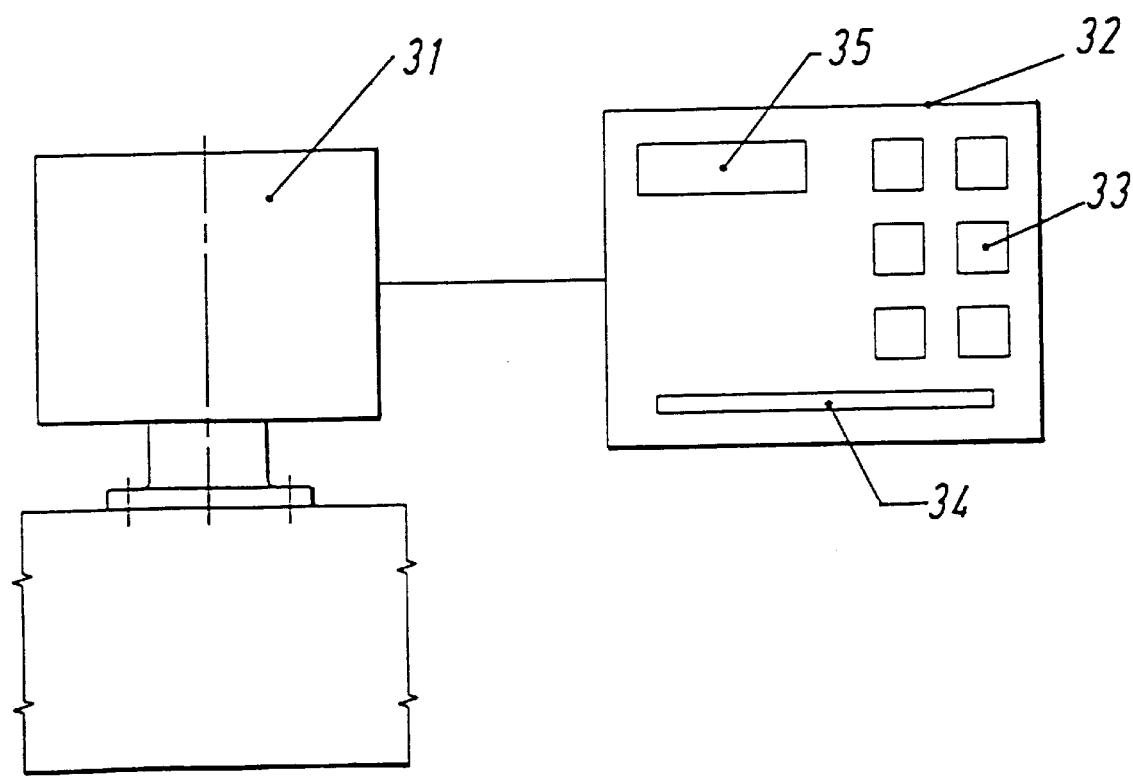
FIG. 4 shows an alternative embodiment.

FIG. 4 schematically shows an alternative embodiment. An actuator 31 is provided instead of adjusting wheel 20 in order to actuate the adjusting device described above. Motor 31 is controlled by an electronic control unit 32 which may comprise programmed and/or programmable memories. By means of keys 33, stored programs may be selected or data may be entered and stored for an automatic control of the rotor position. In addition, disks may be inserted into an entrance 34, programs being read from the disks in order to control the rotor position and/or other parameters such as the rotor speed. The control unit may also be provided with one or several displays 35 allowing to monitor the controlled or programmed value(s).

I claim:
1. A granulating machine comprising,
   a rotor shaft;
   a casing around the shaft;
   a bearing between the shaft and the casing for supporting the rotor shaft for rotation with respect to the casing;
   a frame outside the casing;
   a sieve supported by the frame, the sieve having the form of a truncated cone narrowing downwardly;
   a rotor supported on the rotor shaft to rotate with the shaft and being disposed in the cone of the sieve for being rotated for granulating material in the cone of the sieve;
   a lateral driving element disposed laterally of the shaft and the casing, under the sieve and under the rotor and being in driving connection with the shaft for rotating the shaft, whereby the granulating machine is designed for in-line operation;
   a mechanically-operable axial adjusting device external to the casing and so connected with the rotor shaft for axially displacing the shaft and the rotor thereon with respect to the sieve by non-hydraulic mechanical means;
   an air-cooling system being provided for the rotor shaft, driving shaft, and bearings; and
   an indicator scale connected with the axial adjusting device for indicating the axial position of the shaft responsive to the axial adjusting device.

2. The machine of claim 1, wherein the adjusting device acts upon the bearing of the rotor shaft.

3. The machine of claim 2, wherein said adjusting device comprises a lateral adjusting shaft which is actuatable externally and coupled to a threaded adjusting bushing.

4. The machine of claim 1, wherein the adjusting device comprises a lateral adjusting shaft which is actuatable externally and is coupled to a threaded adjusting bushing, the bushing being on the casing such that upon the adjusting shaft being actuated, the bushing being rotated; and a threaded connection between the rotating bushing and the casing moving the casing axially.

5. The machine of claim 1, wherein the adjusting device comprises a vernier.

6. The machine of claim 1, further comprising a driving shaft coaxial with the rotor shaft, a coupling connecting the rotor shaft to the coaxial driving shaft, the coupling allowing relative axial displacement between the driving shaft and the rotor shaft.

7. The machine of claim 4, wherein the casing comprises a cylindrical portion at its upper end, and the sieve comprises a guiding flange which surrounds the cylindrical portion of the casing.

8. The machine of claim 1, further comprising a retaining ring on the frame on which the sieve is placed, the retaining ring having various support elements each enabling support of the sieve at a different axial position along the rotor shaft axis and the support elements are at various locations around the ring, the ring being capable of being mounted in different rotative angular positions, such that the position of the retaining ring adjusts the height of the sieve as a function of the thickness of the sieve.

9. The machine of claim 8, wherein the retaining ring support elements comprise series of incisions of different depths at locations around the ring, and the retaining ring resting on supporting pins of the machine frame at selected ones of the support elements for adjusting the height of the sieve.

10. The machine of claim 1, wherein the sieve is fastened by means of a clamping ring from the inside of the cone of the sieve.

11. The machine of claim 1, wherein the shaft of the rotor is driven by a belt.

12. The machine of claim 1, wherein means are provided for limiting the axial motion of the rotor and thus to prevent a direct contact of the rotor and the sieve.

13. The machine of claim 1, wherein the axial adjusting device comprises a programmed and/or programmable control to automatically control the position of the rotor.

14. A granulating machine having
a sieve in the form of a truncated cone, a rotor mounted on a shaft and disposed in the sieve, at least one bearing in which the shaft rotates, a lateral driving element which is arranged under the sieve and the rotor and to which the shaft is coupled, whereby the machine is designed for in-line operation;

the rotor including the shaft being axially displaceable by an adjusting device placed for acting upon the rotor shaft beneath the rotor and beneath the sieve for adjusting the relative axial position of the rotor with respect to the sieve;

a retaining ring on which the sieve is placed, the retaining ring being capable of being mounted in different angular rotative positions, the angular position of the retaining ring and of the sieve being adjusted as a function of the thickness of the sieve.

15. The machine of claim 14, wherein the retaining ring includes a series of incisions therein of different depths, a machine frame supporting the casing, the retaining ring resting on supporting pins of the machine frame.

16. A granulating machine having:
sieve in the form of a truncated cone, a rotor mounted on a shaft and disposed in the sieve, at least one bearing in which the shaft rotates, a lateral driving element which is arranged under the sieve and the rotor and to which the shaft is coupled, whereby the machine is designed for in-line operation;

an axial adjusting device connected for axially adjusting the rotor and the rotor shaft; and a rotatable ring supporting the sieve; means at the ring for adjusting the axial position of the ring and the sieve dependent upon the rotative position of the ring around the casing.

* * * * *